(12) United States Patent
Kito

(10) Patent No.: US 6,771,395 B1
(45) Date of Patent: Aug. 3, 2004

(54) IMAGE READING AND PROCESSING APPARATUS, DIGITAL PRINTING APPARATUS USING THE IMAGE READING AND PROCESSING APPARATUS, AND IMAGE READING AND PROCESSING METHOD

(75) Inventor: Eiichi Kito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 687 days.

(21) Appl. No.: 09/661,193

(22) Filed: Sep. 13, 2000

(30) Foreign Application Priority Data

Sep. 13, 1999 (JP) ......................................... H11-259362

(51) Int. Cl.⁷ ................................................ H04N 1/04
(52) U.S. Cl. ...................... 358/474; 358/487; 358/538; 358/517
(58) Field of Search ................................ 358/474, 487, 358/506, 517, 538, 449, 453; 355/40, 32, 38, 52

(56) References Cited

U.S. PATENT DOCUMENTS 6,323,934 B1    11/2001   Enomoto ..................... 355/40

FOREIGN PATENT DOCUMENTS

| JP | 4-350641  | 12/1992 | ........... G03B/27/46 |
| JP | 5-142661  | 6/1993  | ........... G03B/27/46 |
| JP | 2625278   | 4/1997  | ........... G03B/27/46 |
| JP | 10-90802  | 4/1998  | ........... G03B/27/46 |

*Primary Examiner*—Kimberly Williams
*Assistant Examiner*—Negussie Worku
(74) *Attorney, Agent, or Firm*—Sughrue Mion, PLLC

(57) ABSTRACT

An image reading and processing apparatus which reads an original image photographed on a film, and performs image processing on the read image to obtain output data. This apparatus is used in a digital printing apparatus based on an image reading and processing method which prevents or reduces occurrence of a failure to output an image portion actually recorded on the film to a printer or the like, i.e., chipping off the image. From a picture frame of an original image, first image data is read so that the first image data includes data on a picture area and a non-picture area around the picture area. Boundaries of the picture area is determined from the first image data obtained by reading, and second image data is extracted within an image data extraction area which is set according to the determined boundaries of the picture area. Image processing is performed on the extracted second image to obtain output data.

30 Claims, 9 Drawing Sheets

IMAGE READING AND PROCESSING APPARATUS, DIGITAL PRINTING APPARATUS USING THE IMAGE READING AND PROCESSING APPARATUS, AND IMAGE READING AND PROCESSING METHOD

BACKGROUND OF THE INVENTION

1. Field of the Invention

The present invention relates to an image reading and processing apparatus which reads an image formed by light projected onto the image sensor through a film and performs image processing on the read image, and which is arranged to reduce occurrence of chipping off images formed on films. More particularly, the present invention relates to a digital printing apparatus using such an image reading and processing apparatus and to an image reading and processing method relating to the image reading and processing apparatus.

2. Description of the Related Art

A kind of printing apparatus is known which performs digital exposure when an image formed on a photographic film such as a negative film or a reversal film (hereinafter referred to simply as "film") is printed on a light-sensitive material (photographic paper). Digital photoprinters designed as this kind of printing apparatus have recently been put to practical use. That is, this kind of digital photoprinter performs a digital exposure process in which an image formed on a film is photoelectrically read and converted into a digital signal, which is processed by various kinds of image processing to form a recording image data (output data), and an image (latent image) is formed on a light-sensitive material by exposing the light-sensitive material to a scanning beam of recording light which is modulated with the recording image data, thereby obtaining a printed image (finished image).

This digital photoprinter is capable of determining exposure conditions at the time of printing by processing image data obtained as digital image data from an image. Therefore, it can suitably perform correction of washed-out highlights or flat shadows of an image resulting from a flash photography condition or a strongly backlighted condition, sharpness (sharpening) processing, correction of a color failure and a density failure, correction of a result of underexposure or overexposure, correction of a reduction in peripheral light quantity, etc., to obtain a print at a high quality level not attainable by the conventional direct exposure. The digital photoprinter can also perform synthesis of a plurality of images, division of an image, and synthesis of letters by-image data processing, and can output prints freely edited and processed according to uses.

Moreover, the digital photoprinter can form a print from a picture (image data) taken by a digital still camera or the like. Further, it can not only output an image in the form of a print (photograph) but also supply image data to a computer or the like or store image data on a recording medium such as a floppy disk, and therefore the image data can be applied to various uses other than photographic uses.

Basically, the above-described digital photoprinter is constituted by a scanner (image reader) which photoelectrically reads an image recorded on a film, an image processor which processes the read image to form recording image data, and a printer (image recorder) which forms a print by performing scanning exposure of a light-sensitive material according to the image data and by performing development on the light-sensitive material.

For example, if the scanner performs two-dimensional image reading of an image recorded on a film by using an area charge-coupled device (CCD) sensor, the scanner makes light emitted from a light source travel to a film to obtain, through an aperture mask, projection light carrying the image recorded on the film, reads the image by focusing the projection light on the area CCD sensor by an optical system imaging lens and by photoelectrically converting the image into an electrical signal with the area CCD sensor, processes the signal if necessary, and sends the signal as film image data (image data signal) to the image processor.

The image processor sets image processing conditions from the image data previously read by the scanner, performs image processing under the set conditions to form output data (exposure conditions) for recording the image, and sends the output data to the printer.

If the printer is, for example, a unit for performing light beam scanning exposure, it performs two-dimensional scanning exposure (printing) of a light-sensitive material with a light beam modulated according to the output data sent from the image processor, thereby forming a latent image. The printer then performs a predetermined development process, etc., to output a print (photograph) in which the image recorded on the film is reproduced.

In the above-described digital photoprinter, a film on which photographed images are recorded is transferred and stopped by detecting one of the images on the film so that the frame of the image stops at a predetermined position, and projection light from the image recorded on the film is read by the area CCD sensor through the aperture mask. It is important to improve the accuracy with which each image recorded on the film is detected by the sensor and to accurately stop the frame of each photographed image just at the predetermined reading position in order to prevent occurrence of a failure to output an image portion at an end of the image area in the images recorded on the film, i.e., chipping off, or to prevent each of output print images from having a non-photographed area, i.e., a blank image area.

If the scanner performs two-dimensional image reading of images recorded on a film by using a line CCD sensor, each of the photographed images formed on the film is read from the film while the film is being transferred. Transfer of the film for this reading is performed on the basis of photographed image position information detected from prescan image data obtained by previously reading the entire area of the film without distinction between areas where photographed images are formed (hereinafter referred to as picture areas) and areas where no photographed images are formed (hereinafter referred to as non-picture areas). Also in image reading in this case, it is important to accurately extract only the photographed images from the film during transfer of the film so as to prevent occurrence of chipping off and a blank image area as described above.

Japanese Patent No. 2625278 discloses a picture frame positioning method in which an edge of each of picture frames recorded on a photographic film is detected with accuracy no matter what the photographed state in the picture frame, and the detected picture frame is set at a predetermined position by using the result of the detection.

Japanese Patent Application No. 5-142661 discloses a picture frame positioning method which enables a defective picture frame whose edge has not been detected to be correctly set at a predetermined position by fixed-amount positioning transfer. Japanese Patent Application No. 10-90802 discloses a photographic processing apparatus which provides, on a film, marking for positioning with the eye to enable smooth positioning at all positioning points by easier operations if the edges of picture frames on the film cannot be recognized.

In the digital photoprinter using an area CCD sensor in the scanner, however, there is a limit to the accuracy with which the edge of each of photographed images recorded on a film is detected, and there is also variation in the transfer speed, etc., of a transfer system for transferring a film, so that it is extremely difficult to obtain such a high stop position accuracy as a detected photographed image on a film can stop just at the predetermined position and the entire image recorded on the film can be imaged on the area CCD sensor without cutting off any portion of the image and without adding a non-image portion. Under these conditions, in order to prevent printing of a blank image area corresponding to a non-picture area when a photographed image is printed, it is required that, at the time of image reading, projection light carrying the image within an area smaller than the picture area, e.g., an area 10 to 20% smaller than the picture area be obtained through the aperture mask and read by the area CCD sensor.

However, if an image within an area smaller than the picture area of a photographed image recorded on a film is read and printed out by a printer or the like, the above-described chipping off can occur easily to cause a failure to print in the printed image a subject which is actually recorded on the film in an edge portion of the image area.

In the digital photoprinter using a line CCD sensor in the scanner, when each of images recorded on a film is read by predetermined timing relative to the film during transfer of the film, it is extremely difficult to accurately read the entire image on the film without cutting off any portion of the image and without adding a non-image portion, because there are variations of the film picture area corresponding to different kinds of camera, variations of the film picture area due to differences among individual cameras of one kind, etc.

Under these conditions, in order to prevent printing-out of a blank image area corresponding to a non-picture area when a photographed image is printed, it is necessary to obtain data on the image within a predetermined area smaller than the area of the image recorded on the film by, for example, 10 to 20%, and to print the image based on this image data. However, if printing is performed in this manner, the above-described chipping off can occur easily to cause a failure to print in the printed image a subject which is recorded on the film in an edge portion of the image area, since the output print is obtained by reading the image within the area smaller than the area of the photographed image recorded on the film.

SUMMARY OF THE INVENTION

In view of the above-described problem of the conventional art, an object of the present invention is to provide an image reading and processing apparatus for reading and processing an image recorded on a film, more particularly an image reading and processing apparatus which is used in a digital photoprinter for obtaining an output print from an image recorded on a film, and which is designed so as to prevent or reduce occurrence of chipping off which causes a failure to output, in a print or the like, an image portion actually imaged on a film, and an image reading and processing method for performing a process using the image reading and processing apparatus.

To achieve this object, according one aspect of the present invention, there is provided an image reading and processing apparatus comprising an image reading section for reading a picture area of an original image recorded on a film and a non-picture area around the picture area, a picture determination and extraction section for determining boundaries of the picture area from a first image data obtained by the reading performed by the image reading section, and for extracting second image data from the first image data obtained by the reading, within an image data extraction area in the picture area which is set according to the determined boundaries of the picture area, and an image processing section for performing image processing on the second image data obtained by the picture determination and extraction section to obtain output data.

Preferably, in the above-described image reading and processing apparatus, the image reading section comprises one of an area sensor for two-dimensionally reading the picture area and the non-picture area and a line sensor for performing two-dimensional image reading by one-dimensionally reading the picture area and the non-picture area while the film is being transferred.

Preferably, the image reading section of the above-described image reading and processing apparatus has a frame detection sensor for detecting the original image recorded on the film.

If the original image is a slide image, it is preferred that the image reading section performs reading such that a non-picture area on a slide mount is read.

If the image reading section performs a prescan of the original image for previously determining processing conditions of the image processing performed by the image processing section, and a fine scan for obtaining output data, it is preferred that the second image data is extracted from the first image data obtained by the fine scan, or that the boundaries of the picture area are determined from the first image data obtained by the prescan.

Further, it is preferable that the image data extraction area of the picture determination and extraction section are changed in size according to the determined boundaries of the picture area. Preferably, the image data extraction area of the picture determination and extraction section coincides with the entire picture area defined by the determined boundaries. Alternatively, it is preferred that the image data extraction area of the picture determination and extraction section is a designated area determined according to the determined boundaries of the picture area. In such a case, it is preferred that the designated area is selected from a plurality of sets of designated areas.

Also, preferably, the processing performed by the image processing section includes enlargement/reduction processing performed on the second image data so that the processed data matches a predetermined image size. In such a case, it is preferred that the image processing further includes cutting processing for cutting the second image data so that the processed data matches a predetermined aspect ratio of an image.

Preferably, the image reading and processing apparatus is connected to at least one of output units: an image reproducing unit, an image data storage unit, and an image display unit, and the output data obtained by the image processing section is supplied to the output unit.

According to another aspect of the present invention, there is provided a digital printing apparatus comprising an image reading section for reading a picture area of an original image recorded on a film and a non-picture area around the picture area, a picture determination and extraction section for determining boundaries of the picture area from a first image data obtained by the reading performed by the image reading section, and for extracting second image data from the first image data obtained by the reading, within an image data extraction area in the picture area which is set according to the determined boundaries of the picture area, an image processing section for performing image processing on the second image data obtained by the picture determination and extraction section to obtain output data, and an image reproducing unit for outputting a reproduction image from the output data obtained by the image processing section, wherein the image reproducing unit performs image reproduction by using the output data processed at least by enlargement/reduction processing by the image processing section so that the processed data matches an image size of the reproduction image to be reproduced.

Preferably, the digital printing apparatus has an image data storage unit for storing, on a recording medium, the output data processed by the enlargement/reduction processing. Also, preferably, the digital printing apparatus has an image display unit for performing display by using the output data processed by the enlargement/reduction processing.

According to still another aspect of the present invention, there is provided an image processing and reading method in which image data is obtained by reading an original image recorded on a film and is processed by image processing to form output data, the method comprising the steps of reading a picture area of the original image and a non-picture area around the picture area, determining boundaries of the picture area from image data obtained by the reading, extracting second image data from the first image data obtained by the reading, within an image data extraction area in the picture area which is set according to the determined boundaries of the picture area, and performing image processing on the second image obtained by the extracting step to obtain output data.

DESCRIPTION OF THE PREFERRED EMBODIMENTS

An image reading and processing apparatus in accordance with the present invention, a digital printing apparatus using the image reading and processing apparatus, and an image reading and processing method, which represent preferred embodiments of the present invention, will be described below in detail with reference to the accompanying drawings.

Figure 1:
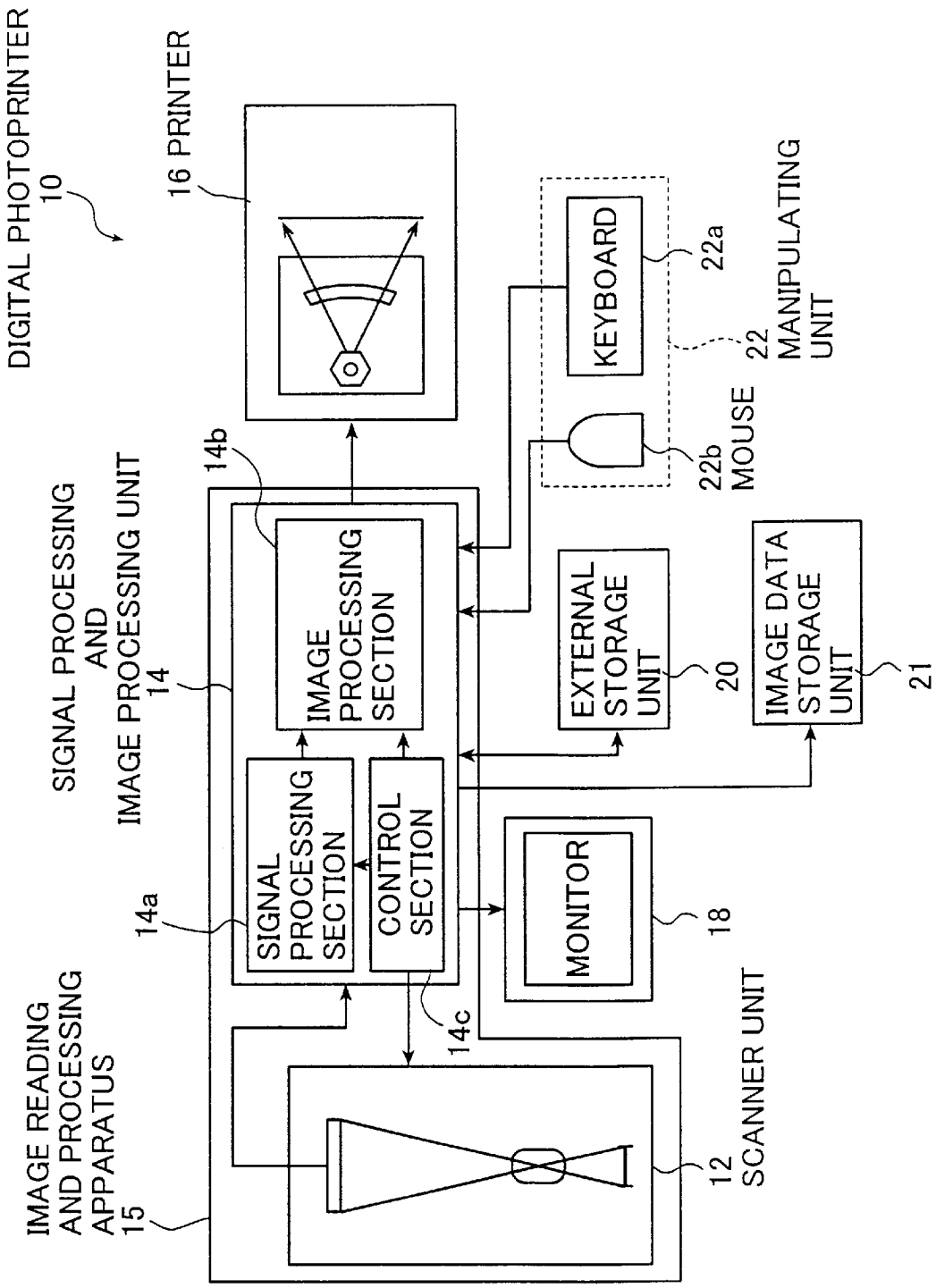
FIG. 1 is a block diagram schematically showing a digital photoprinter which is an embodiment of the digital printing apparatus according to the present invention, and which uses an image reading and processing apparatus in accordance with the present invention.

FIG. 1 is a block diagram schematically showing a digital photoprinter 10 which is an example of the digital printing apparatus of the present invention using an example of the image reading and processing apparatus of the present invention.

The digital photoprinter 10 has an image reading and processing apparatus 15, which has a scanner unit 12, i.e., an image reading device for photoelectrically reading original images recorded on a film, and a signal processing and image processing unit 14 which obtains first digital image data from an image signal read by the scanner unit 12, determines a picture area by detecting a photographed image from the image data with respect to each of a plurality of picture frames, extracts, based on the results of the detection and determination, second image data corresponding to each picture frame, and processes this second image data by various kinds of image processing. The digital photoprinter 10 also has a printer 16 which performs image exposure on a light-sensitive material based on data obtained by image processing, performs a development process and outputs a print carrying a reproduced image; a monitor 18 for displaying images by using image-processed data; an external storage unit 20 constituted by a hard disk (HD), a magneto-optical (MO) recording medium, or a magnetic recording medium such as a magnetic tape or a floppy disk (FD), for storing image processing conditions, exposure conditions and light-sensitive material processing conditions, etc., and a driver for driving the magnetic recording medium; an image data storage unit 21 constituted by a magnetic recording medium such as an HD, an MO, a magnetic tape, an FD or a Smart Media card, for recording and storing image data processed for image enlargement or reduction in the signal processing and image processing unit 14, and a driver for driving the magnetic recording medium; and a manipulating unit 22 using a keyboard 22a and a mouse 22b for inputting information about selection of various processing, processing conditions, correction, etc.

In this embodiment, the printer 16 which is an image reproducing unit, the monitor 18 which is an image display unit, and the image data storage unit 21 which is an image data storage means, are provided as output units. The image reading and processing apparatus of the present invention need not have all these output units and may have only one of them. The printer 16 has been described by way of example as a type of printer which performs a process in which a latent image is formed on a light-sensitive material by exposure and is developed and an output print is obtained from the developed image. However, the printer 16 may be any of other known printers, e.g., an ink jet printer in which ink droplets are jetted to a recording sheet to obtain an output print.

Figure 2:
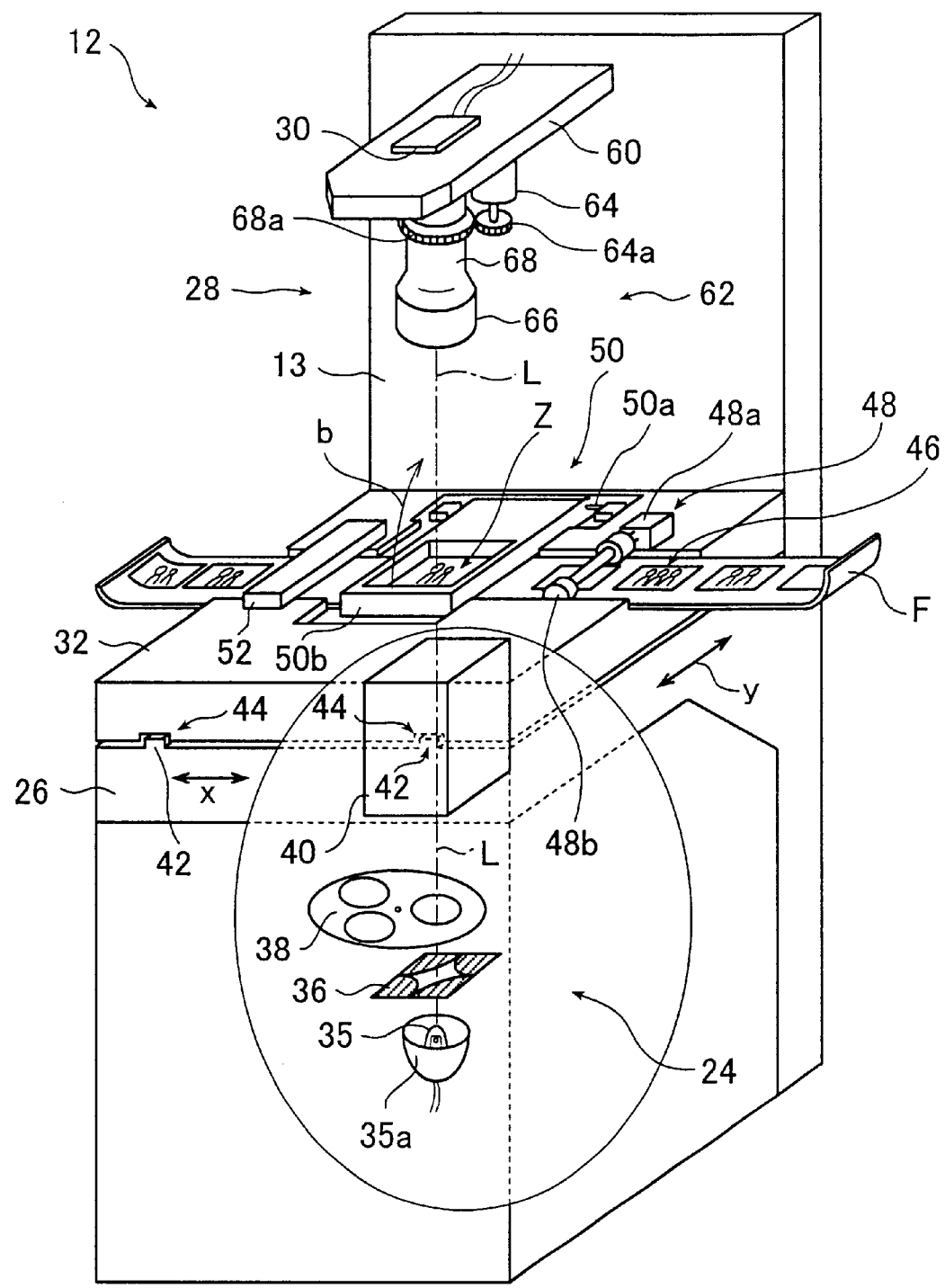
FIG. 2 is a schematic perspective view of a scanner unit constituting the image reading and processing apparatus of the present invention.

FIG. 2 is a schematic perspective view of the scanner unit 12.

The scanner unit 12 shown in FIG. 2 is a unit for photoelectrically reading photographic images in film originals formed on different kinds of films having different sizes, e.g., long strips of negative or reversal film on which a number of images are photographed, and a slide ordinarily formed by fixing one piece of reversal film on a frame member (mount). Basically, the scanner unit 12 is constituted by an optical frame 13, a light source section 24, a carrier base 26, an imaging section 28 having a zoom lens incorporated therein, an area CCD sensor 30 provided as an area sensor, and carriers, such as a film carrier 32 and a slide carrier, interchangeably attached to the carrier base 26.

The film carrier 32 for fittingly supporting a long strip of negative film or reversal film will be mainly described below as a carrier.

In the scanner unit 12, a film F is transferred in the direction x shown in FIG. 2 and stopped at a reading position Z by the film carrier 32 attached to the carrier base 26. An image photographed on the film F at this position is irradiated with light from the light source section 24 to obtain projection light carrying the image photographed on the film F. The projection light is focused to form the corresponding image on the area CCD sensor 30 in the imaging section 28, and the image is photoelectrically converted into an image signal by the area CCD sensor 30. Thus, the image photographed in the film original is two-dimensionally read as an image signal.

The light source section 24 enables the area CCD sensor 30 to precisely read the image in the film original in a state of being decomposed into each of three primary colors red (R), green (G), and blue (B). To do so, the light source section 24 produces a sufficient quantity of light in each of the corresponding colors uniformly diffused and emits the light to the image on the film F. In the illustrated example of the scanner unit 12, the film F is irradiated from below to obtain projection light. Below the carrier base 26 on the optical frame 13 are provided components of the light source section 24: a light source 35, a reflector 35a, an aperture 36, a color filter 38, and a diffuser box 40. In the light source section 24, a cooling fan for cooling various members of the light source 35, etc., and other components are also disposed. Further, a shutter for shutting off light emitted from the light source 35 may be provided if necessary.

As light source 35, any of well-known light sources capable of emitting a quantity of light sufficient for enabling the area CCD sensor 30 to read images can be used. For example, a halogen lamp, a xenon lamp, a mercury lamp or LED may be used.

The aperture 36 is used to adjust the quantity of light from the light source 35. In the illustrated example, the aperture 36 uses two neutral density (ND) filters which have logarithmically-curved light shielding areas, which set different quantities of passing light in directions perpendicular to the optical axis L, and which are moved closer to or away from each other to adjust the quantity of light emitted from the light source 35 to the film.

The color filter 38 comprises three color filters: a red (R) filter, a green (G) filter and a blue (B) filter set in a disk-like member. At the time of image reading, the color filter 38 is rotated on its central shaft by a rotating means (not shown) to change the filter acting at the optical axis L, that is, insert the R filter, the G filter and the B filter in the optical path L one after another, thereby decomposing the image photographed in the film original into three images of three primary colors R, G, and B to be read.

The diffuser box 40 diffuses the quantity of light which is adjusted by the aperture 36 after being emitted from the light source 35 and which has passed the color filter in order that the quantity of light incident upon the film, etc., be uniform on the film surface, i.e., a plane perpendicular to the optical axis L. In the illustrated example, the construction of the diffuser box 40 is such that four side members having mirrors on inner surfaces form the shape of the square prism and diffusing plates are disposed along the square faces of the square prism. Any other well-known light diffusing means may alternatively be used.

The carrier base 26 is located above the light source section 24. The carrier base 26 has a pair of guide rails 42 fitting to channels 44. The film carrier 32 or the like is placed and held on the carrier base 26 at a predetermined position by being positioned by means of the channels 44 and the guide rails 42. The carrier base 26 is fixed relative to the optical frame 13 in the vertical direction. The carrier base 26 has an opening (not shown) formed in its portion about the optical axis L to enable light from the light source section 24 to pass therethrough. This opening is formed according to a maximum frame size such that the entire of the maximum-size image area in film originals readable with the area CCD sensor 30 and a peripheral portion around the image area can be sufficiently irradiated with light from the light source section 24.

The film carrier 32 transfers the long strip of film F, reversal film or the like on which a number of images have been photographed. The long strip of film is thereby transferred in its longitudinal direction so that the images photographed thereon are successively moved to a predetermined position on the optical axis L, i.e., a reading position Z corresponding to the opening (not shown) of the carrier base 26 to be read. In FIG. 2, an example of image reading from the film F is illustrated. A guide channel 46 is formed in an upper surface portion of the film carrier 32 at such a position to intersect the optical axis L while extending between opposite sides of the film carrier 32 along the direction of transfer indicated by arrow x. The film F is transferred in its longitudinal direction corresponding to the direction x in a state of being inserted in the guide channel 46, thereby transferring the images on the film one after another to the reading position Z on the optical axis L.

Further, the film carrier 32 has an opening formed at the reading position Z to enable light from the light source section 24 to pass therethrough. This opening functions as a mask for determining the size of images in film originals read with the area CCD sensor 30 in the input unit 12. Thee shape and area (size) of this opening, i.e. the size of the mask opening area, is determined according to the frame size of film originals disposed in the film carrier 32, e.g., 135-size film F so as to avoid chipping off images. That is, a mask having an opening size slightly larger than the frame size is provided. That is, the entire frame-size area of original images readable in the scanner unit 12 can be sufficiently irradiated with light emitted from the light source section 24 and suitably shaded by the mask, thereby enabling the picture area and a non-picture area around the picture area, i.e., a portion of the non-picture area on the film, to be photoelectrically read with the area CCD sensor 30.

However, if the mask opening size is excessively large relative to the frame size, image information obtained from the picture area at the time of reading with the area CCD sensor described below is reduced. Therefore, the mask opening has a constant size slightly larger than the picture frame size on the film F. The above-described opening does not allow the perforated areas of the film F to be irradiated with reading light even if the opening size is larger. The opening formed in the film carrier 32 may be changed in such a manner that interchangeable mask members corresponding to films of various sizes are prepared and each mask member is detachably attached to the film carrier 32. In the case where a slide having one piece of reversal film fixed on a frame member (mount) is set in place of the long strip of film F, which is a negative film, a reversal film or the like, and image reading from the slide is performed, the picture area, a non-picture area around the picture area, and a slide mount portion as well are photoelectrically read. In this case, the image in the slide may be read by being transferred to the reading position manually or by detecting an edge of the mount without using a frame detection sensor 52 described below.

A transfer device 48 for transferring the film F, a film pressing and setting unit 50 and the frame detection sensor 52 for detecting the frames of images photographed on the film F are arranged along the guide channel 46. A light emitting diode (LED) element (not shown) is placed on one side of the film F opposite from the frame detection sensor 52. Light emitted from the LED element passes through the film F and is received by the frame detection sensor 52. The frame of images on the film F is detected from the quantity of light passing through the film F.

The transfer device 48 is constituted by a motor 48a and transfer rollers 48b. The transfer device 48 intermittently transfers the film F in the direction x. The transfer device 48 stops transferring the film F when the frame detection sensor 52 for detecting photographed images or the DX code informs the transfer device 48 of a detection result indicating the arrival of one of the picture frames on the frame F at the reading position Z. When the transfer device 48 receives a reading completion signal from a control section 14c described below, it restarts transferring the film F to transfer the next image to the reading position Z.

The film pressing and setting unit 50 has a pressing member 50b which has an opening formed therein to allow projection light from the film F to pass therethrough. The film pressing and setting unit 50 swingably moves the pressing member 50b on a rotative shaft 50a in the direction b to firmly set in the guide channel 46 the section of the film F placed at the reading position Z at the time of image reading. The entire image surface of the film F is thereby held at a predetermined position in the direction along the optical axis L, i.e., an original setting position while the film F is straightened from a curled state or the like.

The imaging section 28 for focusing projection light from the film F on the area CCD sensor 30 is arranged on the upper portion of the optical frame 13. The imaging section 28 has a lens unit 62 and a focusing motor 64 both of which are perpendicularly mounted to a surface plate 60 fixed on the optical frame 13. The lens unit 62 has a zoom lens group 66 forming a well-known zoom lens capable of operating for imaging on the area CCD sensor 30 by changing its optical magnifying power according to the size of the film F so that the size of the image area formed by projection light is adjusted to the maximum size receivable by the area CCD sensor 30. The lens unit 62 also has a focusing lens group 68 provided above (on the optical axis L direction downstream side of) the zoom lens group 66 and forming a well-known focusing lens for adjusting the focal point of focusing of projection light to the light receiving surface of the area CCD sensor 30.

A gear 68a for adjustment of the focusing lens group 68 meshes with a gear 64a which is rotated by the focusing motor 64. The focusing lens group 68 is focused by the focusing motor 64 through these gears. That is, the focusing lens group 68 is moved and adjusted to a focusing position. The zoom lens group 66 is moved along the optical axis L by a zooming motor (not shown) so as to adjust the size of an image imaged on the area CCD sensor 30 according to the optical magnifying power. The drive of the focusing motor 64 is controlled by the control section 14c. The scanner unit 12 in the illustrated example performs automatic focusing (AF) by a through-the-lens (TTL) system and by using an image read by the area CCD sensor 30 and the contrast of the image.

Projection light from the film F is focused on the area CCD sensor 30 by the lens unit 62 to be photoelectrically read. A well-known shutter used for dark current correction or the like may be provided between the lens unit 62 and the area CCD sensor 30.

In the scanner unit 12 for performing two-dimensional image reading, the area CCD sensor 30 is an area sensor having, for example, 1380×920 pixels. Also, the illustrated unit may be designed so that the area CCD sensor 30 is movable by a half-pixel distance in each of the x- and y-directions, thereby quadrupling the total number of apparent read pixels.

In an image reading (scan) process performed by the scanner unit 12, low-resolution image reading (prescan) is performed for determination of image processing conditions, etc., before image reading for outputting a print (fine scan). Prescanned image data obtained by a prescan and fine scanned image data obtained by a fine scan are basically equivalent except that they have different resolutions (pixel density) and different signal levels.

An analog image signal read by the area CCD sensor 30 is amplified by an amplifier (not shown) and supplied to the signal processing and image processing unit 14.

The scanner unit 12 is constructed basically as described above.

Figure 3:
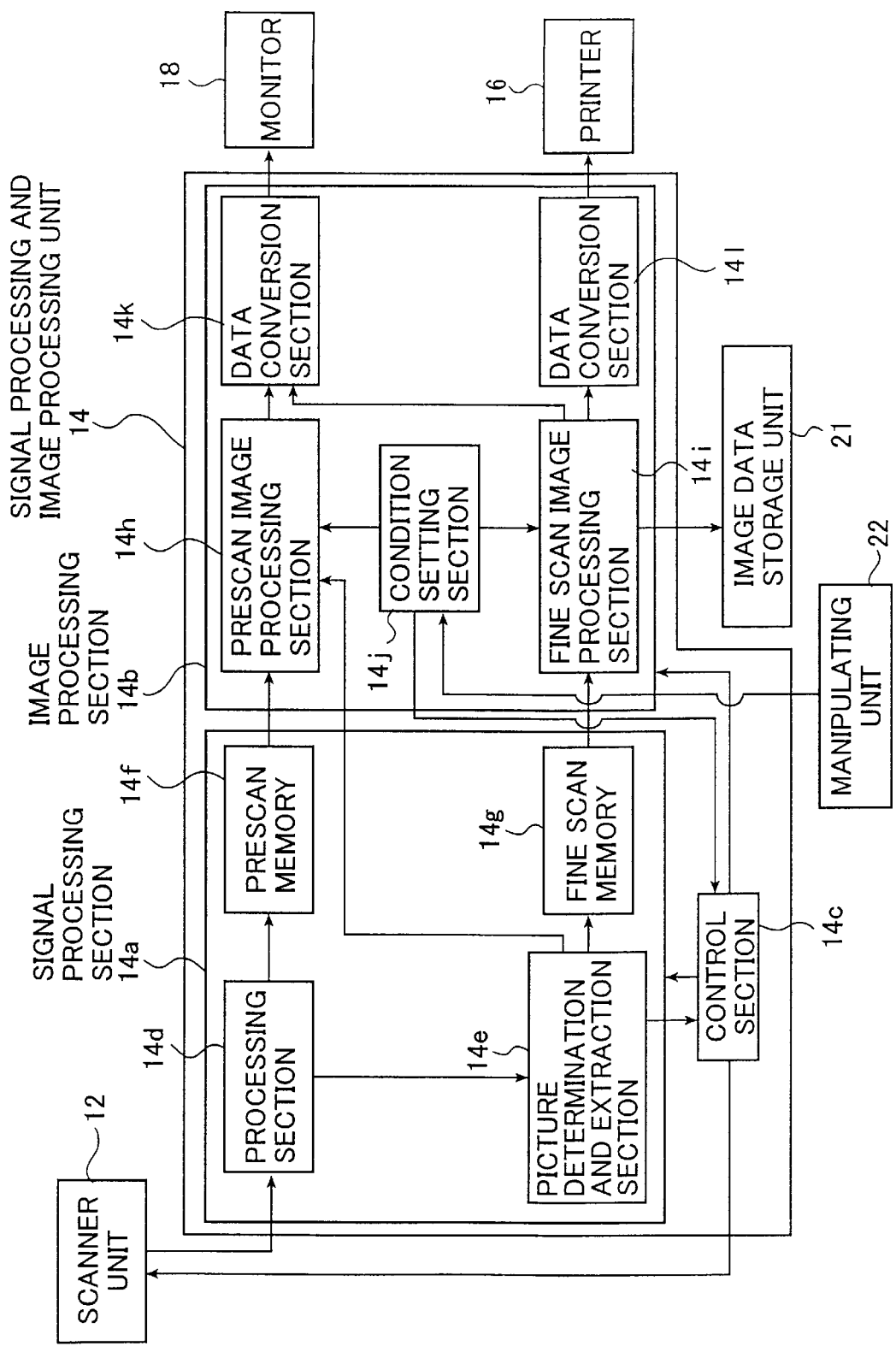
FIG. 3 is a block diagram schematically showing a signal processing and image processing unit constituting the digital photoprinter shown in FIG. 1.

Referring to FIG. 3, the signal processing and image processing unit 14 has a signal processing section 14a which receives the image signal from the scanner unit 12 and processes the image signal by predetermined image processings to obtain image data such as prescanned image data and fine scanned image data; an image processing section 14b which processes the obtained image data by predetermined or desired image processings to obtain output data; and the control section 14c for overall control of the scanner unit 12, for control of each section of the scanner unit 12 and for overall control of the digital printer 10.

The control section 14c has a central processing unit (CPU) for performing control of each section of the scanner unit 12, for example, control of the intensity of light from the light source 35 of the light source section 24, control of the opening of the aperture (iris aperture) 36, and control of selection of the color filters 38, etc., and for performing overall control of the scanner unit 12, as well as control of signal processing operations of the signal processing section 14a; a memory for storing optical magnifying power information for scanning, image sensor information, carrier information, output pixel density information, print sizes from which the image size and the aspect ratio of a printed image are determined, etc.; automatic focusing means for performing automatic focusing by using an image read by the area CCD sensor 30; negative/positive conversion means; and other components.

The signal processing section 14a comprises a processing section 14d which receives the image signal from the area CCD sensor 30 and processes the image signal by predetermined image processings to obtain image data such as prescanned image data and fine scanned image data; a picture determination and extraction section 14e which determines a picture area by detecting a photographed image in each of picture frames from the image data obtained by the processing section 14d, and which extracts image data on the photographed image based on the results of this detection and determination; a prescan memory 14f for storing, as prescanned image data, the image data obtained by the processing section 14d; and a fine scan memory 14g for storing, as fine scanned image data, the image data obtained by the picture determination and extraction section 14e.

The processing section 14d performs analog to digital conversion of the analog image signal read by the area CCD sensor 30 to obtain digital image data, performs DC offset correction of the image data, and performs dark correction of the image data. The processing section 14d then performs logarithmic conversion of the image data and performs shading correction, thus processing the image data. Thereafter, if this image data is prescanned image data, the processing section 14d sends the prescanned image data to the prescan memory 14f. If the obtained image data is fine scanned image data, the processing section 14d sends the normal scan image data to the picture determination and extraction section 14e.

The processing section 14d controls the focusing motor 64 based on the dark-corrected image data so that the lens unit 62 is moved to each of positions spaced apart by a predetermined distance in a predetermined search area, obtains dark-corrected image data at each position and obtains an integrated image contrast value. The processing section 14d repeats these steps, determines a focused position corresponding to the position at which the contrast value is maximized, and controls the motor 64 through a CPU bus so as to set the lens unit 62 at the focused position.

The picture determination and extraction section 14e determines boundaries of a picture area by detecting a photographed image from the fine scanned image data processed by the processing section 14d, and extracts image data in a picture area based on the result of this determination. That is, the picture determination and extraction section 14e determines image data extraction area according to the determined boundaries of the picture area to extract image data corresponding to the picture area, or an area slightly smaller than the picture area. In this embodiment, the image data extraction area, within which image data is extracted, coincides with the entire picture area defined by the determined boundaries.

Fine scanned image data input to and processed by the processing section 14d includes image data corresponding to a non-picture area around the picture area on the film F as well as image data corresponding to the picture area of the picture frame on the film F. Therefore, when the image data is output to the printer 16 through the image processing section 14b, the image data corresponding to the non-picture area is removed to avoid outputting the non-picture area in an output print.

The method of detecting a photographed image and determining a picture area is practiced by considering the fact that, the quantity of light passing through the film F is much different between passing through a picture area and passing through a base portion of a non-picture area. For example, in the quantity of light passing through the negative film F, the quantity of light passing through a picture area is small while the quantity of light passing through the base portion of a non-picture area is large. That is, the difference between the transmission density values corresponding to the image data values is compared with a predetermined transmission density value to detect, in unit positions corresponding to read pixels, the positions of the edges of a photographed image corresponding to the boundaries between the picture area and the non-picture area.

The edges of a photographed image are detected as the shape of a rectangle proper to the film F, and the area surrounded by the detected edges is determined as a picture area. Image data on the image within these boundaries is extracted. Therefore, extracted image data changes according to the determined picture area, so that images processed by a fine scan image processing section 14i described below vary in size. Thereafter, the extracted image data is thinned out so as to have a number of pixels corresponding to that of prescanned image data, then undergoes image processing in a prescan image processing section 14h described below, and is converted by a data conversion section 14k. The image in the picture area corresponding to this image data is displayed on the monitor 18. The picture area is checked with respect to each of a plurality of picture frames by an operator viewing the display screen of the monitor 18.

The above-described method of discriminating and determining a picture area and a non-picture area is not exclusively used, and any other well-known method may alternatively be used. Also, it is possible that, under some photography condition, e.g., underexposure or overexposure, it is difficult to detect boundaries between a picture area and a non-picture area from a transmission density difference, or an apparent edge detection failure may result from such a condition. By considering such a situation, the digital photoprinter 10 may be designed to enable a picture area determination assist process in which an image including a picture area and a non-picture area is displayed on the monitor 18, and the operator inputs edges of the photographed image by using the manipulating unit 22 while viewing the image on the monitor 18.

The extracted fine scanned image data is stored in the fine scan memory 14g.

The image processing section 14b comprises the prescan image processing section 14h which processes prescanned image data by image correction processing, the fine scan image processing section 14i which processes fine scanned image data by image correction processing, a condition setting section 14j for setting processing conditions of these image processings, and data conversion sections 14k and 14l for converting the obtained image data groups from the image processing sections 14h and 14i so that the image data groups become suitable for the monitor 18 and the printer 16 to which the image data groups are output.

The prescan image processing section 14h performs, on prescanned image data, color balancing, contrast correction (gradation processing), lightness correction, dodging processing (compression/expansion of the density dynamic area), saturation correction, sharpness (sharpening) processing, etc. These kinds of processing are performed by a well-known method which suitably combines processings based on calculations and look-up tables (LUTs), processings based on matrix (MTX) calculations and filtering, etc. Color balancing, lightness correction and contrast correction are performed by using LUTs, and saturation correction is performed by MTX calculation. Other processings: sharpness processing, dodging processing, correction of distortion and lateral chromatic aberration of magnification due to a camera lens, etc., are performed according to commands from the operator, for example.

Further, the prescan image processing section 14h processes the image data by enlargement/reduction processing and cutting processing so that a reproduced image has a size suitable for reproduction in an image reproducing unit, e.g., the monitor 18.

The fine scan image processing section 14i processes fine scanned image data by the same image correction processings as those on prescanned image data under image processing conditions checked and approved by the operator with respect to the prescanned image data. The fine scan image processing section 14i further processes the image data by enlargement/reduction processing and cutting processing so that a reproduced image has a size suitable for reproduction in an image reproducing unit, e.g., the printer 16.

The enlargement/reduction processing is performed as described below. The pixel size of an image cut out by the picture determination and extraction section 14e is represented by an input pixel area longer side Hi and an input pixel area shorter side Vi. A predetermined number $E_{k0}$ of defective input pixels is subtracted from these values to obtain a corrected input pixel area longer side Hi and a corrected input pixel area shorter side Vi. On the other hand, an output pixel size obtained by multiplying a print size output to the printer 16 by the pixel density of the printer is expressed by an output pixel area longer side and an output pixel area shorter side. A predetermined number $E_{k1}$ of defective output pixels is added to these values to obtain a corrected output pixel area longer side Ho and a corrected output pixel area shorter side Vo. The value of a magnification ratio is obtained by dividing the corrected output pixel area longer side Ho by the corrected input pixel area longer side Hi. The value of another magnification ratio is obtained by dividing the corrected output pixel area shorter side Vo by the corrected input pixel area shorter side Vi. The larger one of these values is selected to be obtained as a magnification ratio value M. Enlargement/reduction processing is performed by using this value. As a result of this enlarge/reduction processing, some of image portions in very small areas at the ends of the shorter side or longer side used to calculate the lower magnification ratio, which is not selected, is excluded from the area of the resulting output print of the above-mentioned image size.

Therefore, cutting processing is performed as image processing for obtaining only the necessary image data by cutting off image portions defined in very small areas at the ends of the shorter or longer side and excluded from the printed image. In this manner, the maximum image in the picture area corresponding to the aspect ratio of the output print image size can be obtained.

According to the conventional art, there is a need to set the opening size of the mask provided in the carrier 32 smaller than the size of images photographed on film F by, for example, 10 to 20% to allow for a margin of safety in order not to print out the data in the non-picture area. Such a setting entails the problem of a strong possibility of a failure to output in a print an image portion actually photographed on film F. In this embodiment of the present invention, the mask opening size is sufficiently increased, the area CCD sensor 30 reads, as well as the area of an image photographed on film F, a non-picture area which surrounds this image area, and the picture determination and extraction section 14e extracts only image data within the image data extraction area which is set according to the image area. The thus-obtained image data is processed so that the entire area of the image photographed on film F or the maximum image in the picture area corresponding to the desired printed-out image aspect ratio can be printed out. In this manner, the size of printed-out images is always optimized. As mentioned above, the picture determination and extraction section 14e extracts image data on an image in the picture area corresponding to each of a plurality of picture frames. Therefore, if the boundaries of the picture area extracted from the image data change with respect to the picture frames, calculation of magnification ratio M is also performed with respect to each picture frame, and the value of magnification ratio M also changes with respect to each picture frame.

The condition setting section 14j sets image processing conditions in each of the prescan image processing section 14h and the normal scan image processing section 14i by using prescanned image data, and determines parameters of the image processing conditions in combination with those of image processing conditions input by the operator through the manipulating unit 22.

More specifically, from prescanned image data, the condition setting section 14j forms a density histogram and calculates image characteristic values, such as an average density, a large area transmission density (LATD), a highlight density (lowest density), and a shadow density (highest density). Also, according to commands input by the operator through the manipulating unit 22 according to his or her need, the condition setting section 14j determines image processing conditions by operations including forming tables (LUTs) for gray balancing, lightness correction and contrast correction, and preparing a matrix calculation for saturation correction. With respect to the adjustment of lightness, colors, contrast, sharpness, saturation, etc., set by using the keyboard 22a, amounts of adjustment of the image processing conditions (e.g., amounts of correction in LUTs) are calculated and combined as parameters to reset the image processing conditions according to various input commands or the like.

The manipulating unit 22 has the keyboard 22a and the mouse 22b, from which information on reading conditions such as a print size and a reading optical magnifying power which is input, selected, added or corrected, or on processing conditions with respect to color and/or density correction, dodging correction, gradation correction, etc., is supplied to the control section 14c. The operating system 22 supplies such information and a carrier identification code for identification of the film carrier 32 or the like to the control section 14c through the CPU bus.

The signal processing and image processing unit 14 is arranged basically as described above.

The signal processing and image processing unit 14 of this embodiment is arranged so that fine scanned image data is supplied to the picture determination and extraction section 14e to determine a picture area and to extract image data within the picture area. However, the signal processing and image processing unit 14 may alternatively arranged so that prescanned image data is supplied to the picture determination and extraction section 14e to determine a picture area from the prescanned image data; fine scan image data is thereafter read by a fine scan; and image data in the picture area determined from the prescanned image data is extracted from the fine scanned data. In such a case, since prescanned image data is read at a low resolution, there is no need to thin out the image data at the time of display on the monitor 18, so that the processing time is reduced.

In this embodiment, a prescan is performed to determine image processing conditions, etc., and a fine scan is thereafter performed. However, the arrangement may alternatively be such that no prescan is performed to determine image processing conditions; fine scan image reading is performed one time to obtain fine scanned image data;

image processing conditions and a picture area are determined from the fine scanned image data or image data of a smaller number of pixels obtained by thinning out the fine scanned image data; image data within the picture area is extracted from the fine scanned image data according to the result of this determination; and image processing is performed under the determined image processing conditions.

The printer 16 is arranged to perform exposure of a light-sensitive material (photographic paper) according to fine scanned image data to record a latent image thereon, and performs a development process according to the light-sensitive material to output a print of a set (finish) size. For example, the printer 16 cuts the light-sensitive material into pieces of a predetermined length according to output prints, performs back print recording, and performs latent image recording or the like by modulating with image data (recording image) three beams of red (R) exposure light, green (G) exposure light and blue (B) exposure light according to the spectral sensitivity characteristics of the light-sensitive material (photographic paper), by deflecting each beam in a main scanning direction, and by transferring each light-sensitive material in a sub scanning direction perpendicular to the main scanning direction. Thereafter, the printer 16 performs, on the light-sensitive material having a latent image recorded thereon, a predetermined wet development process including color development, bleaching fixation and rinsing, and dries the light-sensitive materila obtained as a print. The printer 16 obtains a number of prints in the above-described manner and sorts and stacks the prints.

The digital photoprinter 10 is constructed basically as described above.

Figure 4:
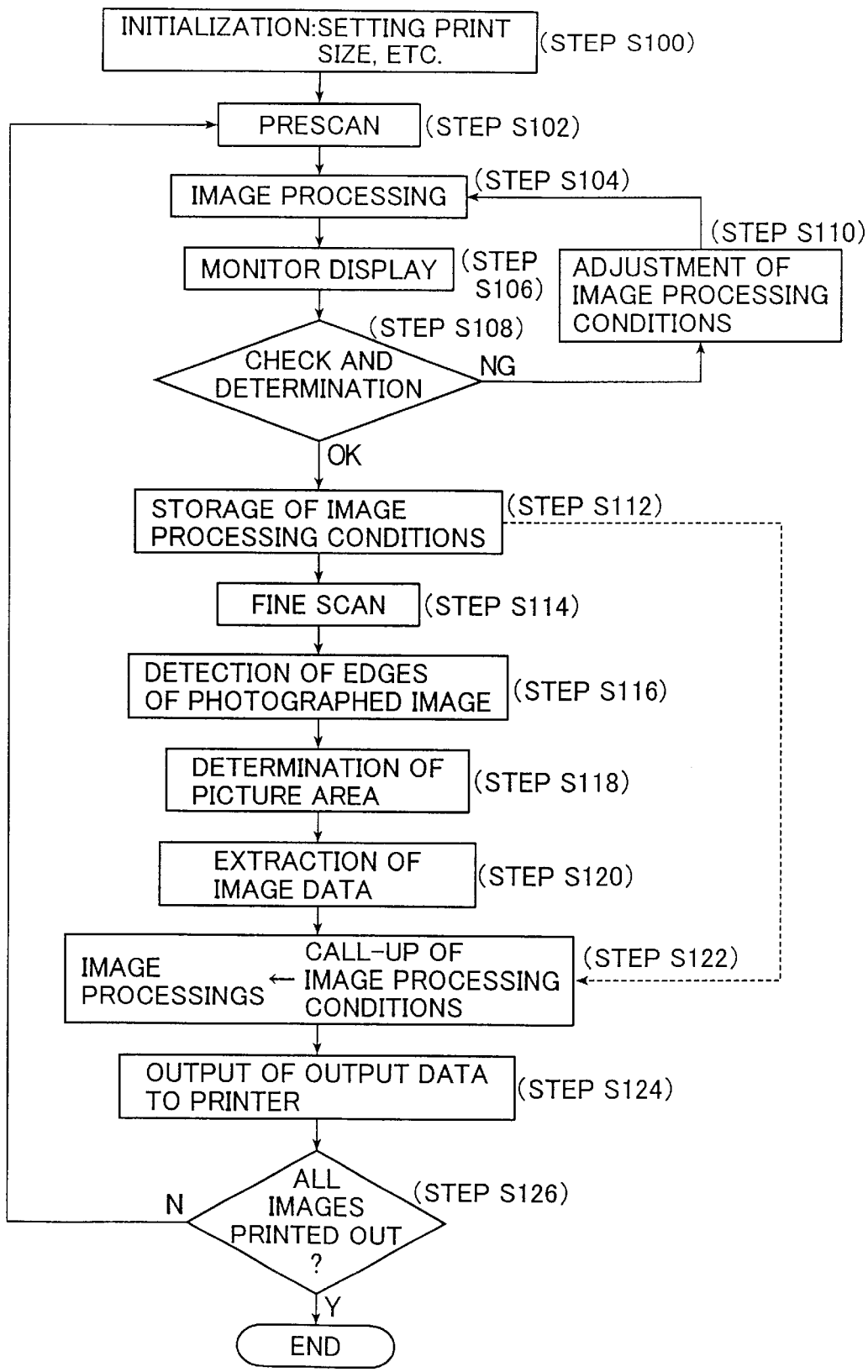
FIG. 4 is a flowchart showing an example of a process according to an image reading and processing method of the present invention.

The image reading and processing method of the present invention using the digital photoprinter 10 will next be described with reference to the flowchart shown in FIG. 4.

First, the power to the digital photoprinter 10 is turned on, and the control section 14c automatically obtains information on the carrier and the light-sensitive material. An operator recognizes the carrier and the light-sensitive material with the eye or the information on the carrier and the light-sensitive material displayed on the screen of the monitor 18, and changes the carrier and the magazine if necessary. Further, the operator inputs a print size, etc., to initialize the digital photoprinter 10 (step s100).

Next, the operator checks whether the digital photoprinter 10 is in a predetermined activated state with respect to the quantity of light from the light source section 24 in the scanner unit 12, etc. The operator then loads a film F on the carrier 32. After film loading, the film carrier 32 transfers the film F by means of the transfer device 48, the frame detection sensor 52 detects a photographed image in the first frame on the film F, and the film carrier 32 transfers the film F so as to set the first photographed image at the reading position Z. If a read start command is then input, a prescan is first started in the scanner unit 12 (step s102).

When the prescan is started, light colored by, for example, the G filter in the color filter 38 inserted in the optical path L in the light source section 24 passes the film to become projection light. The projection light is projected onto the area CCD sensor 30 by the lens unit 62 so that a projected image from the film F imaged on the area CCD sensor 30 coincides generally with the effective pixel area of the area CCD sensor 30, and the G original image is read to form an image signal. This image signal is amplified by the amplifier (not shown), undergoes predetermined signal processings in the signal processing section 14a, and is stored in the prescan memory 14f. Subsequently, the B image and then the R image, for example, are read in the same manner and successively stored in the prescan memory 14f, thus completing the prescan.

Thereafter, the prescanned image data is read out from the prescan memory 14f to undergo predetermined image processings performed by the prescan image processing section 14h (step s104). The processed image data is sent to the data conversion section 14k to be converted into image data suitably displayed on the monitor 18 (step s106). The operator checks the image displayed on the monitor 18 and determines whether the image processing conditions are appropriate (step s108). If the image processing conditions are inappropriate, the image processing conditions are adjusted (step s110). In this case, the desired image processing conditions are input through the manipulating unit 22 to change the set values of the image processing conditions. If the image processing conditions are appropriate, a command to fix the image processing conditions is input through the manipulating unit 22, and the image processing conditions are stored in a predetermined area in the external storage unit 20 or the like (step s112).

During the prescan, automatic focusing of the lens unit 62 is performed by the automatic focusing means using the prescanned image signal-processed in the signal processing section 14a.

Thereafter, a fine scan is started (step s114). By the fine scan, projection light carrying the image of a non-picture area around the picture area of the picture frame as well as the image of the picture area is obtained. The G, B and R images of the film original are successively read by using the projection light, and are supplied to the processing section 14d in the signal processing section 14a. The image signals representing the G, B and R images are processed by the signal processing section 14d to be obtained as fine scanned image data. The picture determination and extraction section 14e is supplied with this fine scanned image data, detects the edges of the photographed image (step s116), and determines the picture area (step s118). The picture determination and extraction section 14e determines image data extraction area based on the result of this determination and extracts only image data within the picture area (step s120). This picture area image data is stored in the fine scan memory 14g. Then, the image data is called to the fine scan image processing section 14i in the image processing section 14b, and the fine scan image processing section 14i calls up the image processing conditions stored in step s112, and performs image correction and other image processings (step s122). For example, color balancing, contrast correction (gradation processing), lightness correction, dodging processing (compression/expansion of the density dynamic area), saturation correction, sharpness (sharpening) processing, etc., are performed. Further, enlargement/reduction processing is performed according to the print image size by an electronic magnification, and cutting processing is performed according to the print image aspect ratio. Also, a negative to positive reversal process is performed by the negative/positive conversion means, thus obtaining output data from the fine scan image processing section 14i. This data is supplied to the data conversion section 14l, which converts the supplied data into output data suitable for the printer 16, and the output data from the conversion section 14l is supplied to the printer 16 (step s124).

The printer 16 cuts the light-sensitive material into pieces of a predetermined length according to output prints, performs back print recording, and performs latent image recording or the like by modulating with the image data the three beams of red (R) exposure light, green (G) exposure light and blue (B) exposure light according to the spectral sensitivity characteristics of the light-sensitive material (photographic paper), by deflecting each beam in the main scanning direction, and by transferring the light-sensitive material in the sub scanning direction perpendicular to the main scanning direction. The printer 16 then performs, on the light-sensitive material having a latent image recorded thereon, a predetermined wet development process including color development, bleaching fixation and rinsing, and dries the light-sensitive material obtained as a print. The printer 16 then sorts and stores the print.

The above-described sequence of steps s102 to s124 is performed with respect to each of picture frames from which an output print is obtained. If a plurality of photographed images are formed on the film F, and if a plurality of output prints are formed from them, the next frame is transferred to and set at the reading position Z and the above-described process including image reading, extraction of image data within the picture area and image processing is performed. The printing process is repeated until all the necessary images are printed out (step s126).

The image data processed in step s122 is supplied as output data to the data conversion section 14k, and the image processed by enlargement/reduction processing, cutting processing, etc., is displayed on the monitor 18.

The image data processed by enlargement/reduction processing and cutting processing is supplied as output data, according to an operator's command, to the image data storage unit 21 constituted by a magnetic recording medium, such as an HD, an MO, a magnetic tape, an FD or a Smart Media card, for recording and storing image data, and a driver for driving the magnetic recording medium.

In the above-described embodiment, the prescan image processing section 14h performs various image processings on prescanned image data. However, the arrangement may alternatively be such that the prescan image processing section 14h does not perform the above-described image processings, and only the fine scan image processing section 14i performs above-described image processings and outputs the results to the printer 16 or any other external unit.

In the above-described embodiment, an area CCD sensor for performing two-dimensional image reading is used in the scanner unit 12. The present invention, however, also comprises an image reading and processing apparatus for two-dimensionally reading, with a line CCD sensor, images on a film F while the film F is being transferred, and a digital photoprinter using such an image reading and processing apparatus.

Figure 5:
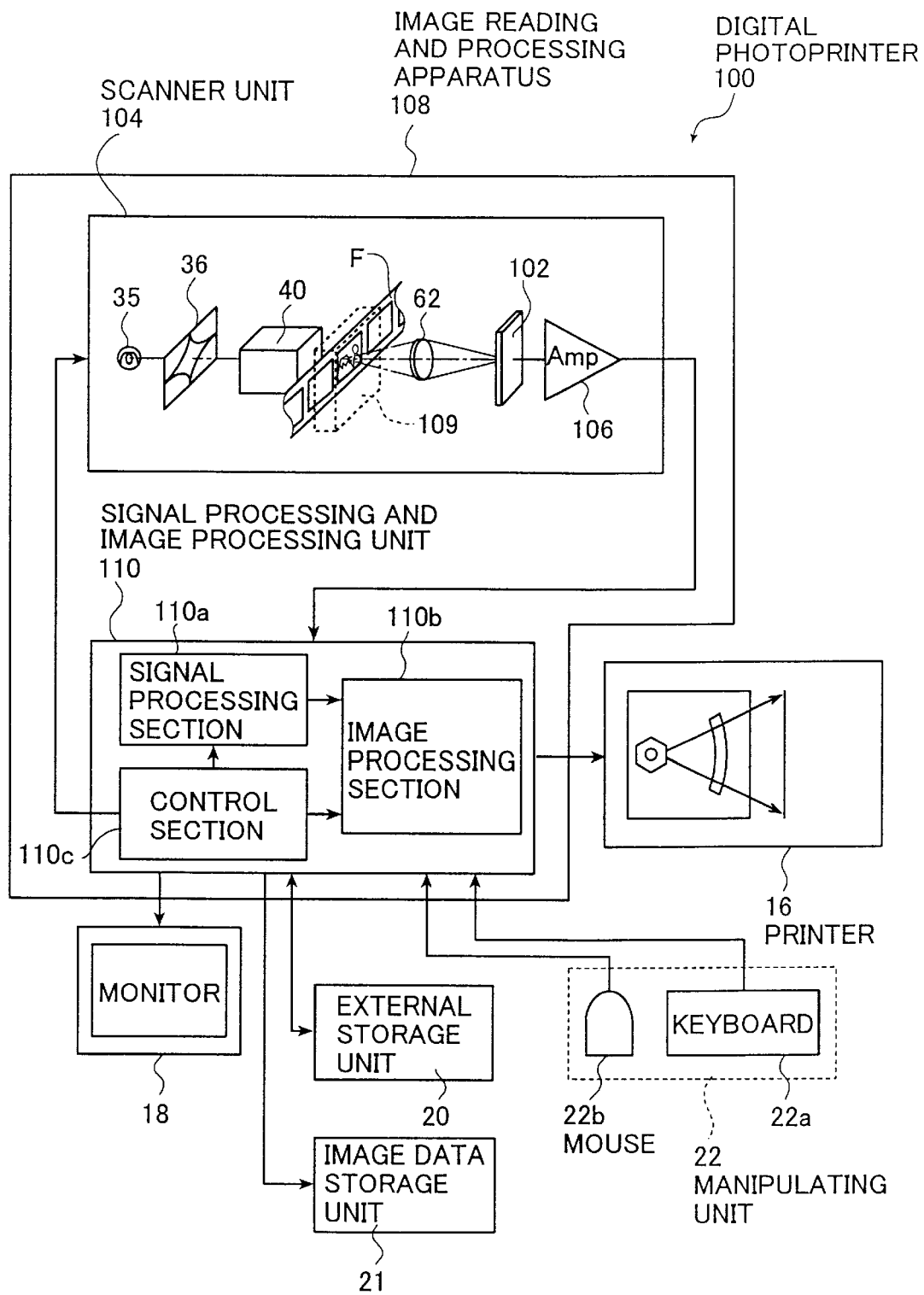
FIG. 5 is a block diagram schematically showing a digital photoprinter which represents another embodiment of the present invention, and which uses an image reading and processing apparatus in accordance with the present invention.

An example of such a digital photoprinter is illustrated as a digital photoprinter 100 in FIG. 5.

FIG. 5 is a block diagram schematically showing the digital photoprinter 100. The digital photoprinter 100 has an image reading and processing apparatus 108, which has a scanner unit 104 for photoelectrically reading original images recorded on a film by using a line CCD sensor 102, and a signal processing and image processing unit 110 which obtains digital image data from an image signal read by the scanner unit 104, determines a picture area by detecting a photographed image from the image data with respect to each of a plurality of picture frames, extracts, based on the results of the detection and determination, image data within the picture area corresponding to each picture frame, and processes this image data by various kinds of image processing. The digital photoprinter 100 also has the above-described printer 16, monitor 18, external storage unit 20, image data storage unit 21, and manipulating unit 22. Components of this digital photoprinter 100 identical in function and construction to those of the digital photoprinter 10 are indicated by the same reference characters, and the description for them will not be repeated.

The scanner unit 104 is a unit for photoelectrically reading images photographed on film F or the like. The scanner unit 104 has a light source 35, an aperture 36, a diffuser box 40, a lens unit 62, the line CCD sensor 102 for reading images, an amplifier 106, and a specially-designed carrier 109 detachably attached to the main body of the scanner unit 104.

Figure 6:
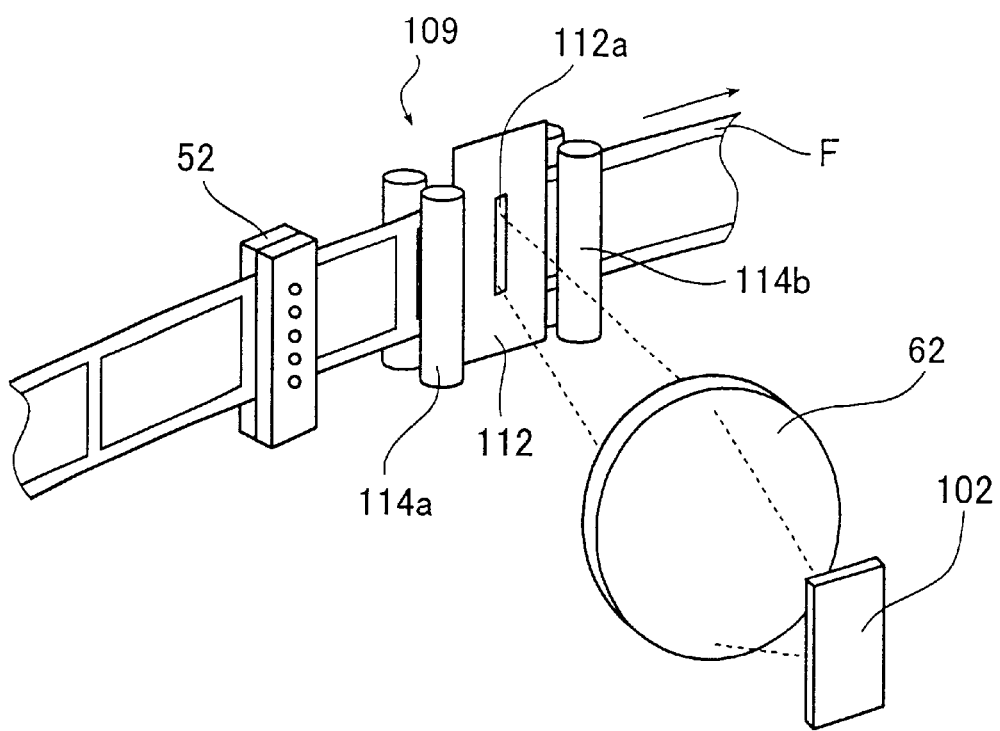
FIG. 6 is a schematic perspective view of an essential portion of a scanner unit constituting the digital photoprinter shown in FIG. 5.

The carrier 109 comprises carriers specially designed to support long strips of film, e.g., the 135-size 24-exposure film, the film in the Advanced Photo System (APS) cartridge, and the film with lens in throwaway camera, and a carrier for reading slides. FIG. 6 schematically shows an example of the carrier 109, which has pairs of transfer rollers 114a and 114b for transferring a film F in the longitudinal direction of the film F while supporting the film F at a predetermined reading position, the pairs of transfer rollers 114a and 114b being disposed on the opposite sides of the reading position in the film transfer direction; a mask 112 having a slit 112a for restricting the path for projection light from the film F to its opening; and a frame detection sensor 52.

The line CCD sensor 102 comprises a line CCD sensor for reading a red (R) image, a line CCD sensor for reading a green (G) image, and a line CCD sensor for reading a blue (B) image. The R image line CCD sensor, the G image line CCD sensor and the B image line CCD sensor are disposed in this order and extend in the direction (main scanning direction) perpendicular to the film F transfer direction (sub scanning direction). The line CCD sensor 102. photoelectrically reads projection light from the film F decomposing it in three primary colors R, G, and B.

In the process of image reading in the scanner unit 104, two scans, i.e., a prescan and a fine scan, are performed, as are those in the above-described digital photoprinter 10 in which reading the images is performed by the area CCD sensor 30. That is, a prescan for reading images at a low resolution is performed to set image processing conditions before image reading (fine scan) for outputting a print. After operator's verification through the monitor 18, a fine scan for reading the images at a high resolution is performed.

To perform the prescan, projection light carrying the image photographed on the film F is obtained by emitting light from the light source 35, adjusting the quantity of light by the aperture 36, making the light uniform by the diffuser box 40, and passing the light through the film F while the film F is being supported at the predetermined reading position and transferred by the carrier 109.

This projection light, after passing the slit 112a to cut off its unnecessary portion, is focused to form the image on the light receiving surface of the line CCD sensor 102 by the lens unit 62, and the image is photoelectrically read by the line CCD sensor 102 to form an image signal, which is amplified by the amplifier 106 and supplied to the signal processing and image processing unit 110. This process is not completed with respect to each of a plurality of picture frames. This process is performed to continuously read the full length of film F by transferring the film at a constant speed without distinction between picture areas and non-picture areas.

To perform the fine scan, projection light carrying the image photographed on the film F is obtained by emitting light from the light source 35, adjusting the quantity of light by the aperture 36, making the light uniform by the diffuser box 40, and passing the light through the film F while the film F is being supported at the predetermined reading position and transferred by the carrier 109. This projection light is the same as that used for the prescan. This projection light is focused to form the image on the light receiving surface of the line CCD sensor 102 by the lens unit 62, and the image is photoelectrically read by the line CCD sensor 102 to form an image signal. This image signal is amplified by the amplifier 106 and supplied to the signal processing and image processing unit 110. This process differs from that for the prescan in that photographed image center position information is obtained from photographed image edge position information obtained at the time of the prescan, and the position of each photographed image is obtained from the center position information to enable image reading from each picture frame.

Figure 7:
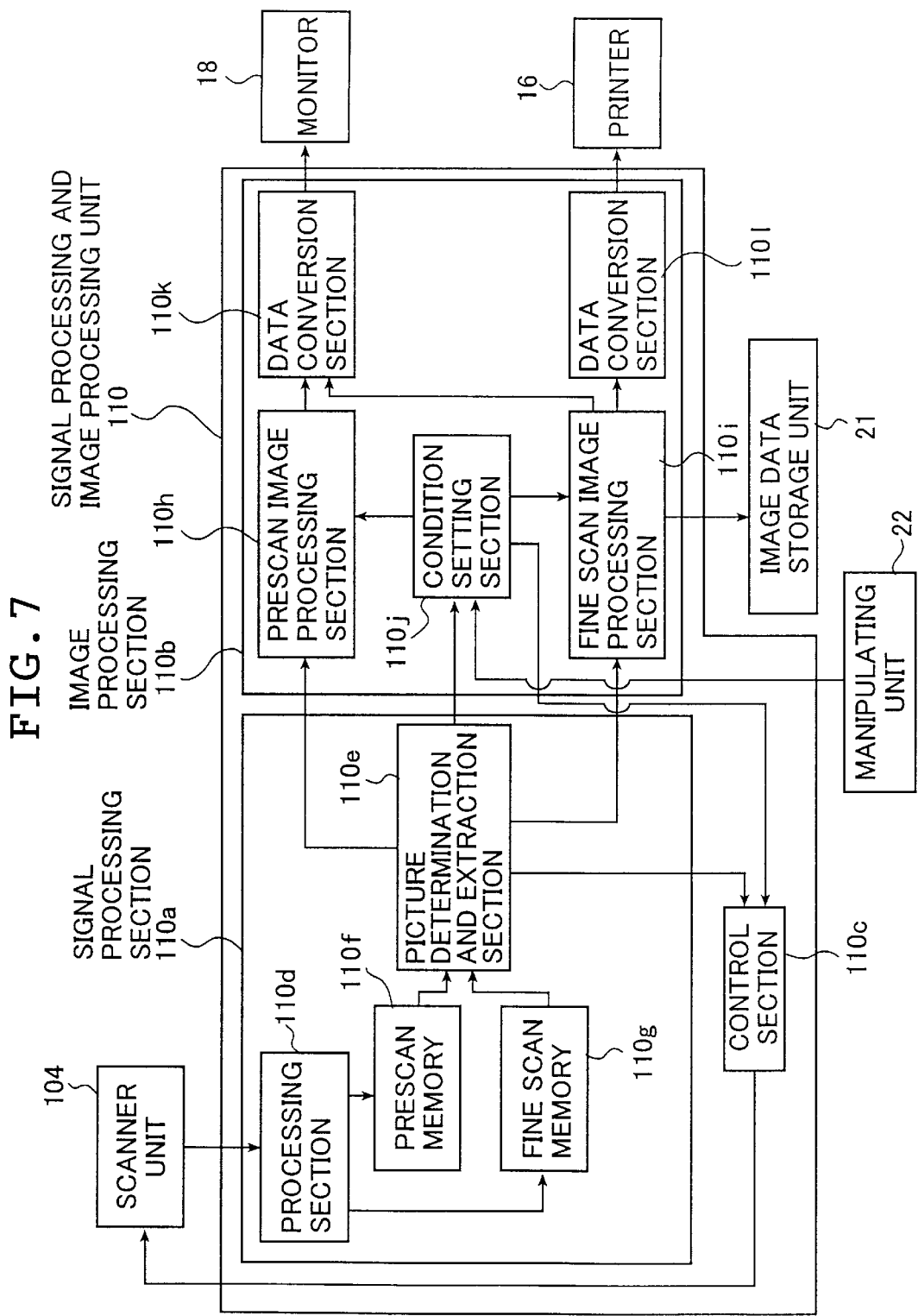
FIG. 7 is a block diagram schematically showing a signal processing and image processing unit constituting the digital photoprinter shown in FIG. 5.

FIG. 7 is a block diagram showing an example of the signal processing and image processing unit 110.

The signal processing and image processing unit 110 is a unit for performing predetermined image processings on fine scanned image data obtained by the scanner unit 104 to supply output data to the printer 16. As shown in FIG. 7, the signal processing and image processing unit 110 has a signal processing section 110a which receives the image signal from the scanner unit 104 and processes the image signal by predetermined image processing to obtain image data such as prescanned image data and fine scanned image data; an image processing section 110b which processes the obtained image data by predetermined or desired image processing to obtain output data; and a control section 110c for overall control of the scanner unit 104, for control of each section of the scanner unit 104 and for overall control of the digital photoprinter 100.

The control section 110c has a central processing unit (CPU) for performing control of each section of the scanner unit 104 and overall control of the scanner unit 104, as well as control of signal processing operations of the signal processing section 110a; a memory for storing read optical magnifying power information, image sensor information, carrier information, output pixel density information, print sizes from which the image size and the aspect ratio of printed images are determined, etc.; automatic focusing means for performing automatic focusing by using an image read by the line CCD sensor 102; negative/positive conversion means; and other components.

The signal processing section 110a comprises a processing section 110d which receives the image signal from the line CCD sensor 102 and processes the image signal by predetermined image processings to obtain prescanned image data and fine scanned image data; a prescan memory 110f for storing prescan image data; and a fine scan memory 110g for storing fine scanned image data, and a picture determination and extraction section 110e.

The processing section 110d performs analog to digital conversion of the analog image signal read by the line CCD sensor 102 to obtain digital image data, performs DC offset correction of the image data, and performs dark correction of the image data. The processing section 110d then performs logarithmic conversion of the image data and performs shading correction, thereby obtaining prescanned image data or fine scanned image data. The processing section 110d sends the processed image data to the prescan memory 110f or to the normal scan memory 110g.

The picture determination and extraction section 110e calls up prescanned image data stored in the prescan memory 110f, detects the edges of a photographed image with respect to each of a plurality of picture frames, determines a picture area, obtains information on the positions of at least three end points on the rectangular shape defining the picture area for each image, obtains the photographed image center position information from the position information for each image, sets image data extraction area, and extracts the image data within picture area. In this embodiment, the set image data extraction area coincides with the entire picture area defined by the determined boundaries.

According to the conventional art, such extracted image data is image data on the image within the predetermined limits about the center of a photographed image, and the predetermined limits are set to as to define an area smaller than the picture area for photographed images in order to prevent printing of a blank image portion. That is, the size of extracted image data is always constant in spite of variations of picture frames. In contrast, according to the present invention, the image data extraction area coincides with the entire picture area defined by the boundaries, and change according to variations of the picture area boundaries. Therefore, the size of extracted image data changes with respect to picture frames if there are variations of the picture frame areas on films corresponding to different kinds of camera used to photograph on the films, or the variations due to slight variations of the optical systems of cameras of one kind.

It is possible that, under some condition, e.g., underexposure or overexposure, it is difficult to detect boundaries between a picture area and a non-picture area from a transmission density difference, or an apparent edge detection failure may result from such a condition. By considering such a situation, the digital photoprinter 100 may be designed to enable a picture area determination assist process in which an image data including a picture area and a non-picture area is displayed on the monitor 18, and the operator inputs edges of the photographed image by using the manipulating unit 22 while viewing the image on the monitor 18.

The image processing section 110b comprises a prescan image processing section 110h which performs image processings on prescanned image data, a fine scan image processing section 110i which performs image processings on fine scanned image data, a condition setting section 110j for setting processing conditions of these image processings, and data conversion sections 110k and 110l for converting the obtained image data groups from the image processing sections 110h and 110i so that the image data groups become suitable for the monitor 18 and the printer 16 to which the image data groups are output.

The prescan image processing section 110h has the same configuration as the prescan image processing section 14h, and performs, on prescanned image data, color balancing, contrast correction (gradation processing), lightness correction, dodging processing (compression/expansion of the density dynamic area), saturation correction, sharpness (sharpening) processing, enlargement/reduction processing and cutting processing for enabling reproduced images to have a size suitable for reproduction in an image reproducing unit, e.g., the monitor 18.

The fine scan image processing section 110i has the same configuration and functions as the fine scan image processing section 14i, and processes fine scanned image data by the same image correction processings as those on prescanned image data under image processing conditions checked and approved by the operator with respect to the prescanned image data. The fine scan image processing section 110*i* also processes the image data by enlargement/reduction processing and cutting processing so that reproduced images have a size suitable for reproduction in an image reproducing unit, e.g., the printer 16.

The condition setting section 110*j* sets image processing conditions in each of the prescan image processing section 110*h* and the fine scan image processing section 110*i* by using prescanned image data, and determines parameters of the image processing conditions in combination with those of image processing conditions input by the operator. The condition setting section 110*j* has the same configuration and functions as the condition setting section 14*j*, and the further description for it will not be repeated.

The data conversion sections 110*k* and 110*l* also have the same configurations and functions as the data conversion sections 14*k* and 14*l*, and the description for them will not be repeated.

Figure 8:
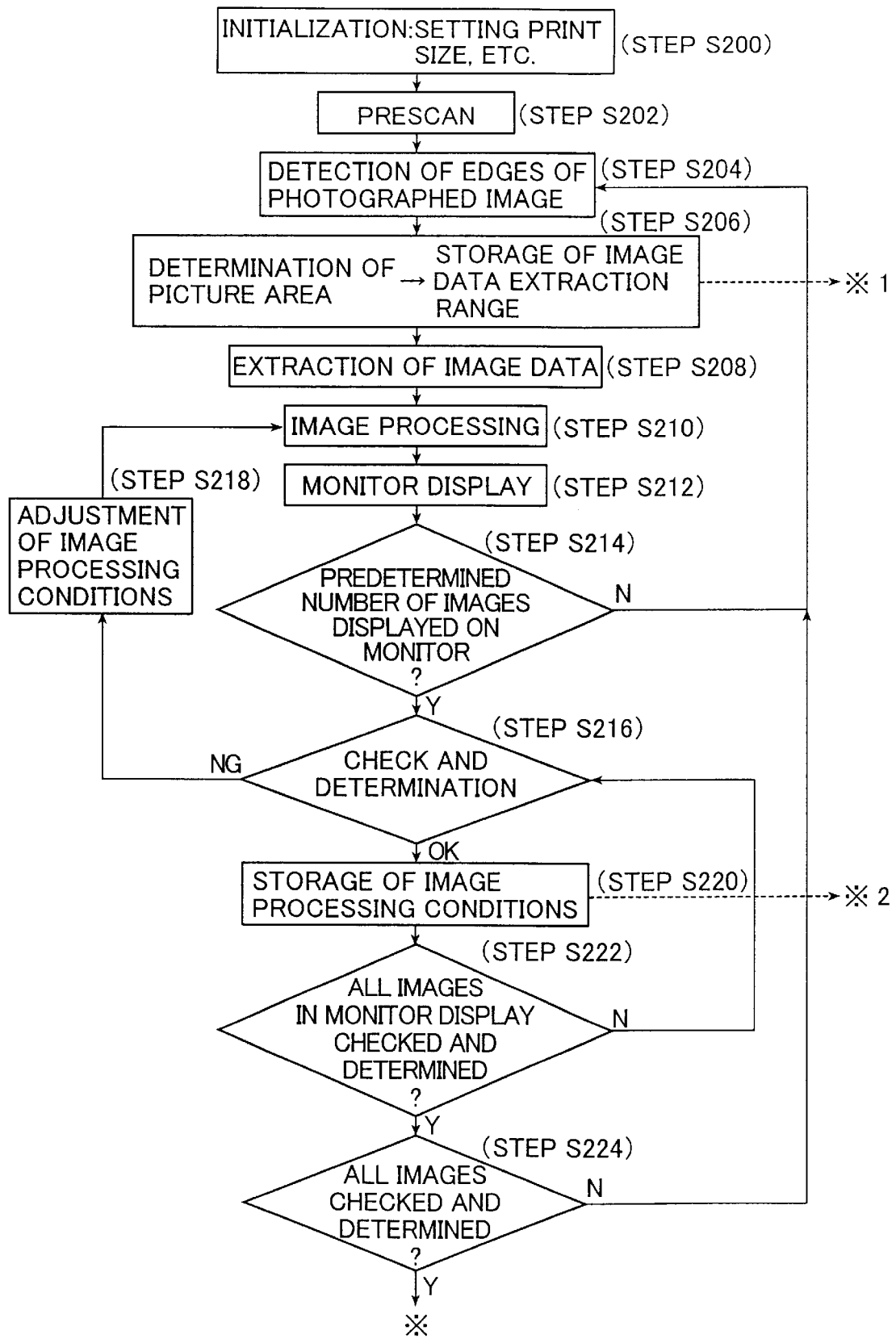
FIG. 8 is a flowchart of a process according to another image reading and processing method of the present invention.
Figure 9:
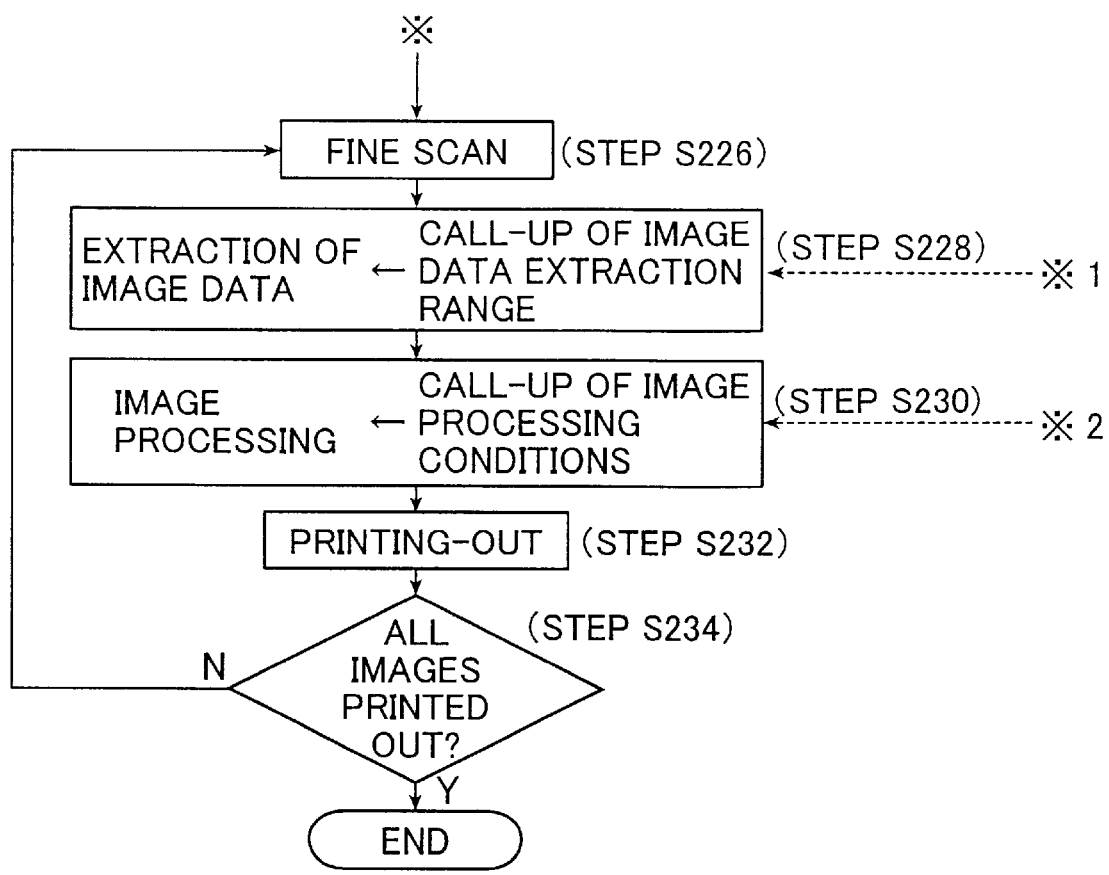
FIG. 9 is a flowchart continued from that in FIG. 8.

The image reading and processing method of the present invention using the thus-arranged digital photoprinter 100 will next be described with reference to the flowchart shown in FIGS. 8 and 9.

First, the power to the digital photoprinter 100 is turned on, and the control section 110*c* automatically obtains information on the carrier and the light-sensitive material. The operator recognizes the carrier and the light-sensitive material with the eye or the information on the carrier and the light-sensitive material displayed on the screen of the monitor 18, and changes the carrier and the magazine if necessary. Further, the operator inputs a print size to initialize the digital photoprinter 100 (step s200).

Next, the operator checks whether the digital photoprinter 100 is in a predetermined activated state with respect to the quantity of light from the light source 35 in the scanner unit 104, etc. The operator then loads a film F on the carrier 109. After film loading, a prescan is performed (step s202).

That is, the carrier 109 transfers the entire film F at a constant speed by the pairs of transfer rollers 114*a* and 114*b*. On the other hand, projection light emitted from the light source 35, quantity-adjusted by the aperture 36 and made uniform by the diffuser box 40 is incident upon the film F transported by the carrier 109. This projection light carrying information on picture areas on the film F and on areas around the picture areas passes the slit 112*a* extending in the main scanning direction, and is focused by the lens unit 62 so as to form an image on the light receiving surface of the line CCD sensor 102. An image signal photoelectrically read by the line CCD sensor 102 is amplified by the amplifier 106 and supplied to the image processing unit 110.

The image signal is processed by the predetermined signal processings in the processing section 110*d* in the signal processing section 110*a*, and is thereafter stored as prescanned image data in the prescan memory 110*f*. The prescanned image data is obtained by reading the overall length of film F without distinction between a plurality of picture frame areas and non-picture areas.

The picture determination and extraction section 110*e* calls up the prescanned image data stored in the prescan memory 110*f*, and detects the edges of the photographed image with respect to each of the picture frames (step s204), determines the boundaries of the picture area, extracts information on the positions of at least three end points of the rectangular picture area, and sets, form this position information, information on the center position of the picture area with respect to each picture frame and image data extraction area corresponding to the entire picture area defined by the determined boundaries. The center position information and the image data extraction area are stored in a predetermined area in the external storage unit 20 or the like (step s206). Image data is extracted from the set image data extraction area to be obtained as prescanned image data corresponding to the picture frame (step s208). Thereafter, the prescanned image data is supplied to the condition setting section 110*j*, and image processing conditions are set and combined with processing conditions input through the manipulating unit 22. The combined image processing conditions are sent to the prescann image processing section 110*h*. The prescanned image data in the picture frame extracted by the picture determination and extraction section 110*e* is sent to the prescan image processing section 110*h*, and the prescan image processing section 110*h* performs enlargement/reduction processing and cutting processing for enabling a reproduced image to have a size suitable for reproduction in an image reproducing unit, e.g., the monitor 18, various kinds of image correction, and other image processings based on the image processing conditions (step s210).

Thereafter, the data conversion section 110*k* performs data conversion for obtaining data suitable for the monitor 18, and the processed image is displayed on the monitor 18 (step s212). The steps s204 to s212 are performed with respect to each picture frame with which the boundaries of the picture area are determined, and a determination is made as to whether a predetermined number of images, e.g., six images have been extracted and displayed on the monitor 18 (step s214). If it is determined that the predetermined number of images have been displayed, the operator verifies each image displayed on the monitor 18 (step s216). If the image processing conditions are inappropriate and there is a need to reset the image processing conditions, the operator inputs the desired image processing conditions through the manipulating unit 22, thereby adjusting the image processing conditions (step s218). The image processings are thereafter performed again. If the image processing conditions are appropriate, the operator inputs, through manipulating unit 22, a command to fix the image processing conditions and to store the image processing conditions in a predetermined area in the external storage unit 20 or the like (step s220). Verification is continued with respect to all the images displayed on the monitor 18 (step s222). After the completion of verification with respect to all the images displayed on the monitor 18, the steps s202 to s214 are performed with respect to other picture frames. Determination is made as to whether verification has been completed with respect to all the desired photographed images (step s224). The steps s204 to s222 are repeated until the completion of the verification with respect to all the photographed images recorded on the film F.

A fine scan is started after the fixing all image processing conditions (step s226).

First, the information on the center position of the picture area corresponding to each picture frame, stored in step s206, is called up, and film F is rewound and stopped based on this center position information so that the desired picture frame stops at the predetermined position by the frame detection sensor 116. Thereafter, transfer of the film F is started for image reading. Image reading is performed in the same manner as the prescan by using the projection light passing through the film F and focused on the line CCD sensor 102. The fine scan differs from the prescan in that the picture area and a non-picture area around the picture area are read with respect to each picture frame.

The read image signal is amplified by the amplifier 106 and supplied to the signal processing section 110*a* to be processed by the predetermined signal processings. Fine scanned image data is thereby obtained and stored in the normal scan memory 110g.

Thereafter, the picture determination and extraction section 110e calls up the fine scanned image data, also calls up the image data extraction area stored in step s206, and extracts, according to the image data extraction area, the image data within the picture area from the fine scanned image data including the non-picture area, which has been read with respect to each picture frame (step s228). The extracted image data is sent to the fine scan image processing section 110i.

The fine scan image processing section 110i calls up the image processing conditions stored in step s220, and performs image processings including image correction, enlargement/reduction processing for outputting prints, and cutting processing for removing end portions of the picture area to extract only the necessary image data corresponding to the aspect ratio of images reproduced by the printer 16 or the like (step s230). The obtained image data is supplied to the data conversion section 110l to be converted into output data suitable for the printer 16, the output data is sent to the printer 16, and an image is thereby printed out (step s228).

Determination is made as to whether there is a plurality of photographed images on the film F and whether all the desired photographed images have been printed out (step s230). If printing of all the images has not been completed, the fine scan is performed with respect to another picture frame to be printed out. The corresponding photographed image is printed out by the above-described process. Thus, all the desired photographed images are printed out.

The digital photoprinters 100 using the line CCD sensor 102 in the scanner unit 104 has been described. In the above-described embodiment, the picture determination and extraction section 110e detects the photographed image in each picture frame from prescanned image data to determine the boundaries of a picture area, and sets the image data extraction area with respect to the picture frame according to the determined boundaries of the picture area. According to the present invention, the arrangement may alternatively be such that a photographed image is detected from fine scanned image data to determine the boundaries of a picture area, and image data extraction area is set with respect to each picture frame according to the determined picture area boundaries.

Each of the picture determination and extraction sections 14e and 110e of digital photoprinters 10 and 100 automatically detects the edges of a picture area. However, it is not always necessary to automatically perform this detection. To assist the picture determination and extraction section 14e or 110eto determine picture area boundaries, the operator may manually designate edges of a photographed image through the operating system 22.

Image data extraction area set according to the determined boundaries of a picture area in each of the picture determination and extraction sections 14e and 110e in the scanner units 12 and 104 of digital photoprinters 10 and 100 coincides with the entire picture area defined by the determined boundaries. However, image data extraction area may be a designated area selectively designated within the boundaries of the picture area of an image photographed on the film F, as described below.

That is, each of the picture determination and extraction sections 14e and 110e may extract image data according to image data extraction area selected by the operator from, for example, designated area defining an area which is 98% of the area defined by the determined picture area boundaries, designated area defining an area which is 96% or 94% of the area defined by the determined picture area boundaries, designated area matching the aspect ratio of the image to be printed out and defining the maximum area within the determined picture area boundaries, etc. Preferably, the selection of such designated area is made when the corresponding image in the picture area is displayed on the monitor 18. That is, a designation frame or designation frames for determining one of the sets of designated areas is or are displayed together with the image in the picture area to enable the operator to select the extraction area while viewing the display. Further, in such a case, the designation frame displayed on the monitor 18 can be freely moved in vertical and horizontal directions in the displayed picture area according to operator's commands while being constantly maintained in size, so that the area from which image data is extracted can be freely set by moving the designation frame.

If designated area selectively designated as described above are set as image data extraction area, the pixel size of image data extracted by the picture determination and extraction section 14e or 110e at the time of image reading for printing or the like can be made constant with respect to the picture frames, thereby eliminating the need for calculating the magnification ratio M with respect to each picture frame in the enlargement/reduction processing performed in the image processing section 14b or 110b. As a result, the image processing speed is increased and the print outputting efficiency is improved. Since the operator can select the pixel size of extracted data, the possibility of redoing of image reading due to, for example, an individual variation of the scanner unit 12 or 104 or an error in positioning of the picture frame performed by stopping a picture area on the film F at a reading position according to a detection result from the frame detection sensor 52 or 116 can be reduced, and printing can be performed economically.

The components of the image processing unit 110 may be provided as hardware formed of specially designed circuits, or the corresponding functions may be achieved by software, i.e., processes executed by a computer. Also, a combination of hardware and software designed to perform the same functions may be used.

The image reading and processing apparatus, the digital printing apparatus and the image reading and processing method of the present invention have been described in detail. Needless to say, the present invention is not limited to the above-described embodiments, and other various modifications and changes may be made without departing from the scope of the invention.

According to the present invention, as described above in detail, a picture area on a film in which an image is recorded and a non-picture area surrounding the picture area are previously read by a scanner unit, and image data in the picture area is extracted from the image data previously read and is output to a printer or the like after being suitably processed, thereby preventing or reducing occurrence of a failure to output an image portion actually recorded on the film to a printer or the like, i.e., chipping off.

Also, from the image in the entire picture area recorded on the film, image data in the picture area is extracted according to some of designated area selectively designated. In this manner, the need for calculating the magnification ratio according to an output image size with respect to each of a plurality of picture frames is eliminated, the image processing speed is increased and the print outputting efficiency is improved. Further, the possibility of redoing of image reading due to, for example, an individual variation of the scanner unit or an error in positioning of the picture frame performed by stopping a picture area on a film at a predetermined position can be reduced, and printing can be performed economically.

What is claimed is:

1. An image reading and processing apparatus comprising:
   an image reading section for reading a picture area of an original image recorded on a film and a non-picture area around the picture area;
   a picture determination and extraction section for determining boundaries of the picture area from a first image data obtained by the reading performed by the image reading section, and for extracting second image data from the first image data obtained by the reading, within an image data extraction area in the picture area which is set according to the determined boundaries of the picture area; and
   an image processing section for performing image processing on the second image data obtained by the picture determination and extraction section to obtain output data.

2. The image reading and processing apparatus according to claim 1, wherein the image reading section comprises one of an area sensor for two-dimensionally reading the picture area and the non-picture area and a line sensor for performing two-dimensional image reading by one-dimensionally reading the picture area and the non-picture area while the film is being transferred.

3. The apparatus of claim 2, wherein said one of an area sensor and a line sensor reads the image in half-pixel distances.

4. The image reading and processing apparatus according to claim 1, wherein the image reading section comprises a frame detection sensor for detecting the original image recorded on the film.

5. The image reading and processing apparatus according to claim 1, wherein, if the original image is a slide image, the image reading section performs reading such that a non-picture area on a slide mount is read.

6. The image reading and processing apparatus according to claim 1, wherein, if the image reading section performs a prescan of the original image for previously determining processing conditions of the image processing performed by the image processing section, and a fine scan for obtaining output data, the second image data is extracted from the first image data obtained by the fine scan.

7. The image reading and processing apparatus according to claim 6, wherein, the boundaries of the picture area are determined from the first image data obtained by the prescan.

8. The image reading and processing apparatus according to claim 1, wherein the image data extraction area of the picture determination and extraction section are changed in size according to the determined boundaries of the picture area.

9. The image reading and processing apparatus according to claim 1, wherein the image data extraction area of the picture determination and extraction section coincides with the entire picture area defined by the determined boundaries.

10. The image reading and processing apparatus according to claim 1, wherein the image data extraction area of the picture determination and extraction section is a designated area determined according to the determined boundaries of the picture area.

11. The image reading and processing apparatus according to claim 10, wherein the designated area is selected from a plurality of sets of designated areas.

12. The image reading and processing apparatus according to claim 1, wherein the processing performed by the image processing section includes enlargement/reduction processing performed on the second image data so that the processed data matches a predetermined image size.

13. The image reading and processing apparatus according to claim 12, wherein the image processing includes cutting processing for cutting the second image data so that the processed data matches a predetermined aspect ratio of an image.

14. The image reading and processing apparatus according to claim 1, wherein the image reading and processing apparatus is connected to at least one of output units:
   an image reproducing unit, an image data storage unit, and an image display unit, and the output data obtained by the image processing section is supplied to the output unit.

15. The apparatus of claim 1, wherein said image reading section further comprises a mask, said mask having a frame size larger than a frame size of said original image recorded on a film, said mask enabled to pass light therethrough from a light source to said original image recorded on a film.

16. The apparatus of claim 15, wherein said mask does not allow a perforated edge of said original image recorded on a film to be irradiated with said light from said light source.

17. The apparatus of claim 1, wherein said determining boundaries of the picture area further comprises evaluating picture area transmission density values and non-picture area transmission density values against a predetermined transmission density value to detect, in unit positions corresponding to read pixels, the positions of edges of a photographed image corresponding to the boundaries of said picture area and said non-picture area.

18. A digital printing apparatus comprising:
   an image reading section for reading a picture area of an original image recorded on a film and a non-picture area around the picture area;
   a picture determination and extraction section for determining boundaries of the picture area from a first image data obtained by the reading performed by the image reading section, and for extracting second image data from the first image data obtained by the reading, within an image data extraction area in the picture area which is set according to the determined boundaries of the picture area;
   an image processing section for performing image processing on the second image data obtained by the picture determination and extraction section to obtain output data; and
   an image reproducing unit for outputting a reproduction image from the output data obtained by the image processing section,
   wherein the image reproducing unit performs image reproduction by using the output data processed at least by enlargement/reduction processing by the image processing section so that the processed data matches an image size of the reproduction image to be reproduced.

19. The digital printing apparatus according to claim 18, further comprising an image data storage unit for storing, on a recording medium, the output data processed by the enlargement/reduction processing.

20. The apparatus of claim 18, wherein said reading a picture area includes reading the picture area in half-pixel distances.

21. The digital printing apparatus according to claim 18, further comprising an image display unit for performing display by using the output data processed by the enlargement/reduction processing.

22. The apparatus of claim 18, wherein said image reading section further comprises a mask, said mask having a frame size larger than a frame size of said original image recorded on a film, said mask enabled to pass light therethrough from a light source to said original image recorded on a film.

23. The apparatus of claim 22, wherein said mask does not allow a perforated edge of said original image recorded on a film to be irradiated with said light from said light source.

24. The apparatus of claim 18, wherein said determining boundaries of the picture area further comprises evaluating picture area transmission density values and non-picture area transmission density values against a predetermined transmission density value to detect, in unit positions corresponding to read pixels, the positions of edges of a photographed image corresponding to the boundaries of said picture area and said non-picture area.

25. An image processing and reading method in which image data is obtained by reading an original image recorded on a film and is processed by image processing to form output data, the method comprising the steps of:

reading a picture area of the original image and a non-picture area around the picture area;

determining boundaries of the picture area from image data obtained by the reading; extracting second image data from the first image data obtained by the reading, within an image data extraction area in the picture area which is set according to the determined boundaries of the picture area; and performing image processing on the second image obtained by the extracting step to obtain output data.

26. The apparatus of claim 1, wherein said reading a picture area includes reading the picture area in half-pixel distances.

27. The method of claim 25, wherein said determining boundaries of the picture area further comprises evaluating picture area transmission density values and non-picture area transmission density values against a predetermined transmission density value to detect, in unit positions corresponding to read pixels, the positions of edges of a photographed image corresponding to the boundaries of said picture area and said non-picture area.

28. The method of claim 25, wherein said reading a picture area includes reading the picture area in half-pixel distances.

29. The method of claim 25, wherein said reading of a picture area further comprises the use of a mask, said mask having a frame size larger than a frame size of said original image recorded on a film, said mask enabled to pass light therethrough from a light source to said original image recorded on a film.

30. The method of claim 29, wherein said mask does not allow a perforated edge of said original image recorded on a film to be irradiated with said light from said light source.

* * * * *